US011973260B2

(12) United States Patent
Chang et al.

(10) Patent No.: US 11,973,260 B2
(45) Date of Patent: Apr. 30, 2024

(54) ANTENNA

(71) Applicant: Industrial Technology Research Institute, Hsinchu (TW)

(72) Inventors: Ruo-Lan Chang, New Taipei (TW); Mei-Ju Lee, Hsinchu (TW); Cheng-Hua Tsai, New Taipei (TW); Meng-Hsuan Chen, Taichung (TW); Wei-Chung Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/984,214

(22) Filed: Nov. 9, 2022

(65) Prior Publication Data

US 2023/0163443 A1 May 25, 2023

Related U.S. Application Data

(60) Provisional application No. 63/278,071, filed on Nov. 10, 2021.

(30) Foreign Application Priority Data

Oct. 3, 2022 (TW) ................................ 111137587

(51) Int. Cl.
*H01Q 1/12* (2006.01)
*H01Q 1/00* (2006.01)
(Continued)

(52) U.S. Cl.
CPC ........... *H01Q 1/1285* (2013.01); *H01Q 1/007* (2013.01); *H01Q 9/0457* (2013.01); *H01Q 9/065* (2013.01); *H01Q 19/10* (2013.01)

(58) Field of Classification Search
CPC ...... H01Q 1/007; H01Q 1/364; H01Q 1/1271; H01Q 1/1278; H01Q 1/1285; H01Q 1/38;
(Continued)

(56) References Cited

U.S. PATENT DOCUMENTS

| | | | |
|---|---|---|---|
| 7,274,334 | B2 | 9/2007 | O'Riordan et al. |
| 2003/0034917 | A1 | 2/2003 | Nishizawa et al. |

(Continued)

FOREIGN PATENT DOCUMENTS

| | | |
|---|---|---|
| CN | 203039108 | 7/2013 |
| CN | 203225336 | 10/2013 |

(Continued)

OTHER PUBLICATIONS

"Office Action of Taiwan Counterpart Application", dated Aug. 11, 2023, p. 1-p. 3.

*Primary Examiner* — Robert Karacsony
(74) *Attorney, Agent, or Firm* — JCIPRNET

(57) ABSTRACT

A light-transmitting antenna includes a substrate, a first and a second conductive pattern. The first and the second conductive pattern is disposed on a first and a second surface of the substrate respectively. The first conductive pattern includes a first feeder unit, a first and a second radiation unit, a first and a second coupling unit and a first parasitic unit. The first feeder unit is connected to the second radiation unit. The first and the second radiation unit are located between the first and the second coupling unit. One side and the other side of the first parasitic unit is connected to the second coupling unit and adjacent to the first coupling unit respectively. The second conductive pattern includes a second feeder unit, a third coupling unit, a second parasitic unit, and a fourth coupling unit.

16 Claims, 4 Drawing Sheets

(51) Int. Cl.

| | |
|---|---|
| ***H01Q 9/04*** | (2006.01) |
| ***H01Q 9/06*** | (2006.01) |
| ***H01Q 19/10*** | (2006.01) |

(58) Field of Classification Search

CPC .. H01Q 1/50; H01Q 1/14; H01Q 1/16; H01Q 1/2291; H01Q 1/44; H01Q 5/307; H01Q 5/385; H01Q 9/045; H01Q 9/0457; H01Q 9/065; H01Q 9/28; H01Q 9/285; H01Q 19/10

See application file for complete search history.

(56) References Cited

U.S. PATENT DOCUMENTS

| | | | | |
|---|---|---|---|---|
| 2021/0126370 | A1 | 4/2021 | Tang | |
| 2021/0280973 | A1 | 9/2021 | Chan et al. | |
| 2022/0167499 | A1 * | 5/2022 | Johnston ................ | H05K 3/107 |

FOREIGN PATENT DOCUMENTS

| | | | | |
|---|---|---|---|---|
| CN | 108022907 | | 5/2018 | |
| CN | 108206332 | | 6/2018 | |
| CN | 111164828 | | 5/2020 | |
| CN | 113437504 | | 9/2021 | |
| TW | 200642164 | | 12/2006 | |
| TW | 201640739 | | 11/2016 | |
| WO | WO2023283756 | A1 * | 1/2023 | ............... H01Q 1/38 |

* cited by examiner

ANTENNA

CROSS-REFERENCE TO RELATED APPLICATION

This application claims the priority benefits of U.S. Provisional Application Ser. No. 63/278,071, filed on Nov. 10, 2021 and Taiwan application serial no. 111137587, filed on Oct. 3, 2022. The entirety of each of the above-mentioned patent applications is hereby incorporated by reference herein and made a part of this specification.

TECHNICAL FIELD

The disclosure relates to an antenna, and also relates to a light-transmitting antenna.

BACKGROUND

Currently, the relay technology is gradually adopted in the wireless communication technology to improve the wireless communication coverage area, group mobility, cell-edge throughput of base stations and provision of temporary network deployment. In the 5th generation (5G) communication system, in order to improve the coverage of signals, it is better to dispose the base stations on the middle floor of the building, rather than on the roof far from the ground. However, the urban environment is complex, and it is extremely difficult to find a place to install the antenna. If the antenna may be installed on the indoor window, and the coverage may be improved through the glass, the light-transmitting and inconspicuous design of the light-transmitting antenna is both beautiful and functional, which may save a lot of trouble of site selection and site installation. Of course, the performance of the light-transmitting antenna also directly affects the user experience of the wireless network.

SUMMARY

According to the embodiment of the disclosure, a light-transmitting antenna is provided, which has better performance.

According to the embodiment of the disclosure, the light-transmitting antenna includes a substrate, a first conductive pattern, and a second conductive pattern. The substrate has a first surface and a second surface opposite to each other. The first conductive pattern is disposed on the first surface, and includes a first feeder unit, a first radiation unit, a first coupling unit, a first parasitic unit, a second radiation unit, and a second coupling unit. The first feeder unit is connected to the second radiation unit. The first radiation unit and the second radiation unit are located between the first coupling unit and the second coupling unit. One side of the first parasitic unit is connected to the second coupling unit. The other side the first parasitic unit is adjacent to the first coupling unit. The second conductive pattern is disposed on the second surface, and includes a second feeder unit, a third coupling unit, a second parasitic unit, and a fourth coupling unit. An orthographic projection of the second feeder unit on the first surface overlaps the first feeder unit, the first radiation unit, and the second radiation unit. An orthographic projection of the third coupling unit on the first surface overlaps the first coupling unit. An orthographic projection of the fourth coupling unit on the first surface overlaps the second coupling unit. An orthographic projection of the second parasitic unit on the first surface overlaps the first parasitic unit. One side of the second parasitic unit is connected to the fourth coupling unit. The other side of the second parasitic unit is adjacent to the third coupling unit.

Based on the above, the light-transmitting antenna according to the embodiment of the disclosure has the characteristics of broadband, high gain, and multiple frequencies.

DETAILED DESCRIPTION OF DISCLOSED EMBODIMENTS

Figure 1:
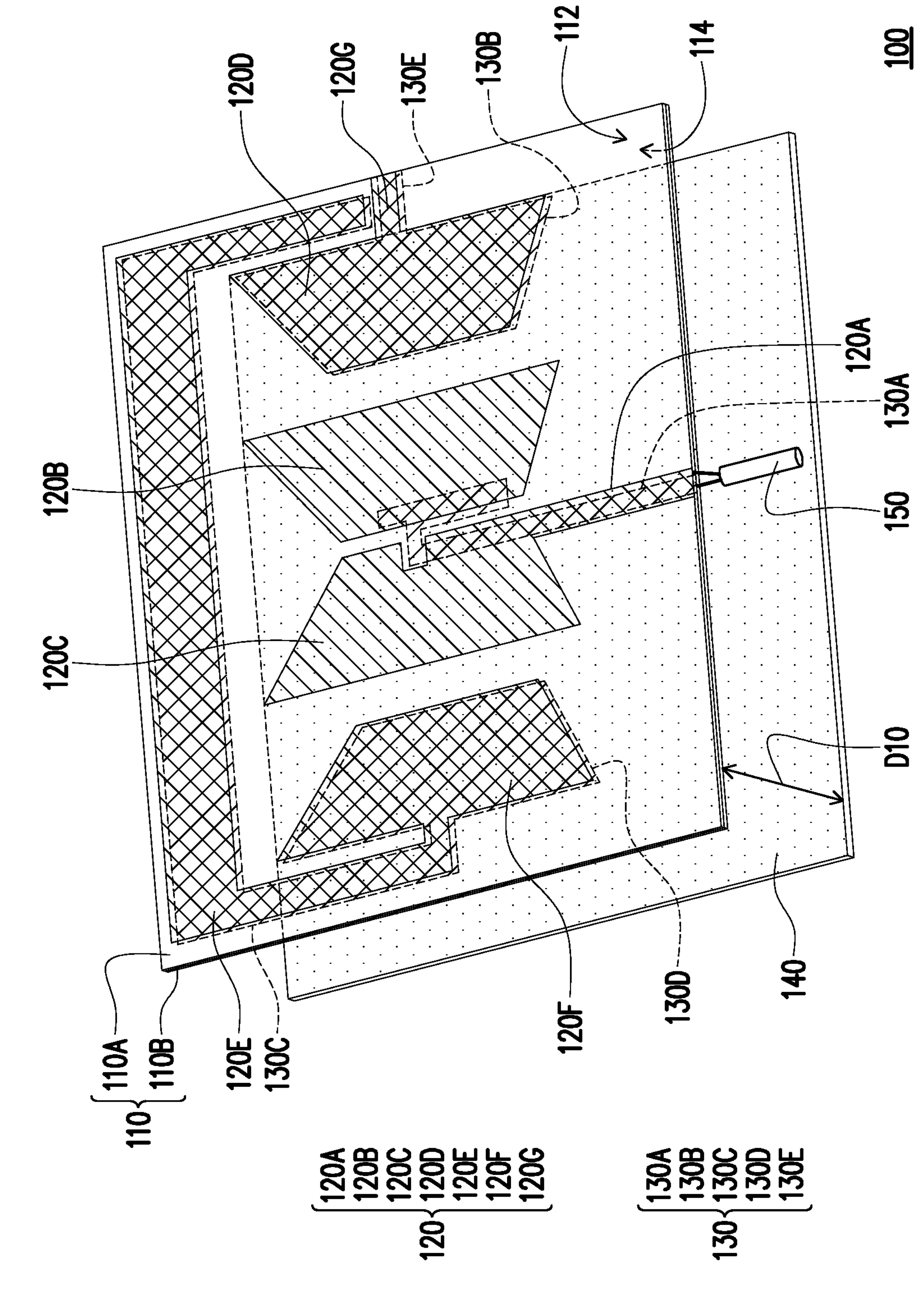
FIG. 1 is a schematic perspective view of a light-transmitting antenna according to an embodiment of the disclosure.

FIG. 1 is a schematic perspective view of a light-transmitting antenna according to an embodiment of the disclosure. Referring to FIG. 1, a light-transmitting antenna 100 of this embodiment includes a substrate 110, a first conductive pattern 120, and a second conductive pattern 130. The substrate 110 has a first surface 112 and a second surface 114 opposite to each other. The first conductive pattern 120 is disposed on the first surface 112, and includes a first feeder unit 120A, a first radiation unit 120B, a first coupling unit 120D, a first parasitic unit 120E, a second radiation unit 120C, and a second coupling unit 120F. The first feeder unit 120A is connected to the second radiation unit 120C. The first radiation unit 120B and the second radiation unit 120C are located between the first coupling unit 120D and the second coupling unit 120F. One side of the first parasitic unit 120E is connected to the second coupling unit 120F. The other side of the first parasitic unit 120E is adjacent to the first coupling unit 120D. The second conductive pattern 130 is disposed on the second surface 114, and includes a second feeder unit 130A, a third coupling unit 130B, a second parasitic unit 130C, and a fourth coupling unit 130D. An orthographic projection of the second feeder unit 130A on the first surface 112 overlaps the first feeder unit 120A, the first radiation unit 120B, and the second radiation unit 120C. An orthographic projection of the third coupling unit 130B on the first surface 112 overlaps the first coupling unit 120D. An orthographic projection of the fourth coupling unit 130D on the first surface 112 overlaps the second coupling unit 120F. An orthographic projection of the second parasitic unit 130C on the first surface 112 overlaps the first parasitic unit 120E. One side of the second parasitic unit 130C is connected to the fourth coupling unit 130D. The other side of the second parasitic unit 130C is adjacent to the third coupling unit 130B.

In the light-transmitting antenna 100 of this embodiment, the first feeder unit 120A of the first conductive pattern 120 and the second feeder unit 130A of the second conductive pattern 130 are coupled to each other, so that a signal may be fed in by capacitive feeding. In addition, both the first conductive pattern 120 and the second conductive pattern 130 have high light transmittance, which are adapted to be installed indoors to improve coverage of an indoor network, avoid cable signal loss when the antenna is installed outdoors and pulled into a room with a long cable, and also do not affect indoor lighting and maintain the aesthetics. In addition, the light-transmitting antenna 100 of this embodiment has characteristics such as full-plane currents, multiple frequencies, narrow beams, and high gain.

In this embodiment, the substrate 110 has no conductive through holes. That is, the light-transmitting antenna 100 is not required to be provided with the conductive through hole that shields the light, but uses the first feeder unit 120A and the second feeder unit 130A to pull a signal feeding position to an edge of the substrate 110, so as to avoid an opaque spot in a central area of the light-transmitting antenna 100, which does not affect the line of sight and maintain the aesthetics. In this embodiment, the light-transmitting antenna 100 may further include a feeder 150. The first feeder unit 120A and the second feeder unit 130A are respectively electrically connected to the feeder 150 at the edge of the substrate 110.

In this embodiment, the substrate 110 includes a first substrate 110A and a second substrate 110B that are stacked with each other. A surface of the first substrate 110A facing away from the second substrate 110B is the first surface 112. A surface of the second substrate 110B facing away from the first substrate 110A is the second surface 114. The first substrate 110A and the second substrate 110B are stacked with each other, for example, in direct contact with each other without a gap substantially. Under this architecture, the first conductive pattern 120 may be formed on the first substrate 110A by a single-sided process, and the second conductive pattern 130 may also be formed on the second substrate 110B by the single-sided process. The overall process cost is low, and the yield is high.

In this embodiment, the light-transmitting antenna 100 further includes an electromagnetic wave reflector 140 that is stacked with the substrate 110 at a distance. That is, the electromagnetic wave reflector 140 is stacked with the substrate 110, but keeps a distance from each other. Since the electromagnetic wave reflector 140 is disposed, the electromagnetic wave reflector 140 has functions of electromagnetic wave reflection and shielding, which may improve directivity of the antenna, and may further isolate the environmental influence. In this embodiment, the light-transmitting antenna 100 has an operating wavelength. A distance D10 between the electromagnetic wave reflector 140 and the substrate 110 is, for example, between 0.25 times and 2 times the operating wavelength. For example, the distance D10 between the electromagnetic wave reflector 140 and the substrate 110 may be 3 cm.

In this embodiment, the second conductive pattern 130 is located between the first conductive pattern 120 and the electromagnetic wave reflector 140. However, in other embodiments, the first conductive pattern 120 may also be located between the second conductive pattern 130 and the electromagnetic wave reflector 140.

Figure 2:
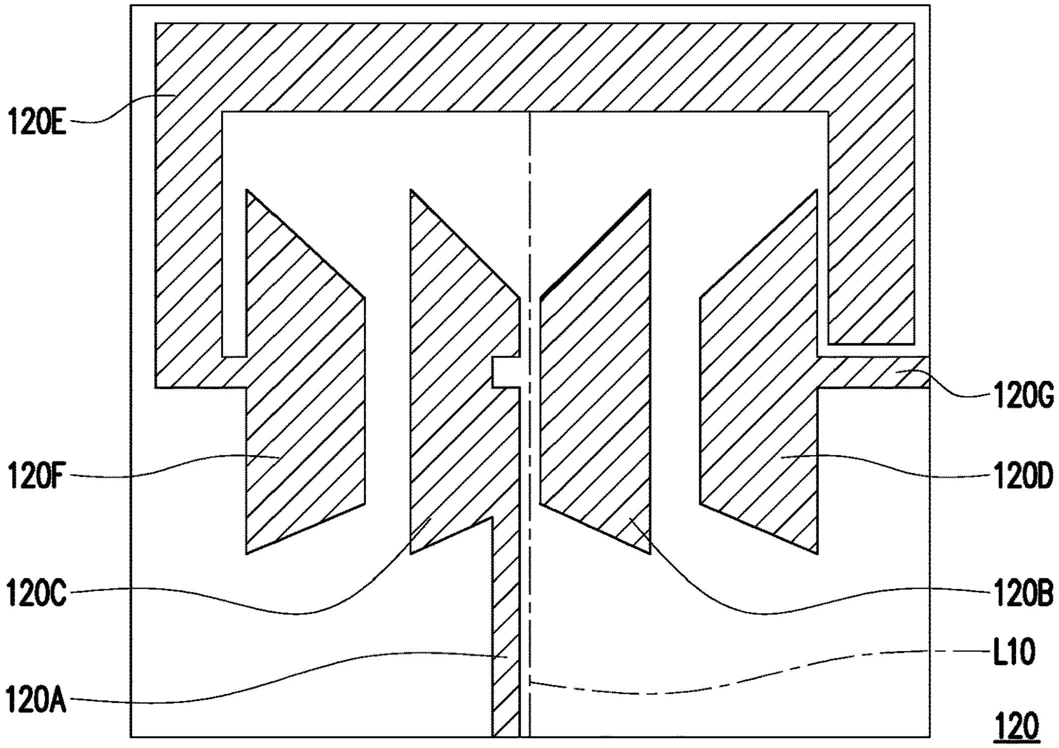
FIG. 2 is a schematic view of a first conductive pattern of the light-transmitting antenna of FIG. 1.

FIG. 2 is a schematic view of the first conductive pattern 120 of the light-transmitting antenna 100 of FIG. 1. Referring to FIG. 2, in this embodiment, the first radiation unit 120B and the second radiation unit 120C are trapezoidal. In addition, the first coupling unit 120D and the second coupling unit 120F may also be trapezoidal. In this embodiment, two base angles of the trapezoids of the radiation units are not equal, but the disclosure is not limited thereto. The first radiation unit 120B is not connected to the first coupling unit 120D, and the second radiation unit 120C is also not connected to the second coupling unit 120F. The first radiation unit 120B is located between the second radiation unit 120C and the first coupling unit 120D. The second radiation unit 120C is located between the first radiation unit 120B and the second coupling unit 120F.

In this embodiment, a shape of the first radiation unit 120B and a shape of the second radiation unit 120C are line-symmetrical patterns with a boundary line L10 therebetween as a symmetrical line. In this embodiment, although the shape of the first radiation unit 120B is not completely line-symmetrical to the shape of the second radiation unit 120C because the second radiation unit 120C has a small gap in the middle, the shape of the first radiation unit 120B is still substantially line-symmetrical to the shape of the second radiation unit 120C. In this embodiment, a shape of the first coupling unit 120D and a shape of the second coupling unit 120F are line-symmetrical patterns with the boundary line L10 therebetween as the symmetrical line. Similarly, the shape of the first coupling unit 120D and the shape of the second coupling unit 120F is not required to be completely line-symmetrical, and may only be substantially line-symmetrical. In addition, in this embodiment, the shape of the first radiation unit 120B is substantially the same as the shape of the first coupling unit 120D, but the disclosure is not limited thereto.

In this embodiment, the first conductive pattern 120 further has a third parasitic unit 120G. The third parasitic unit 120G is connected to the first coupling unit 120D. The other side of the first parasitic unit 120E is adjacent to the first coupling unit 120D and the third parasitic unit 120G.

Figure 3:
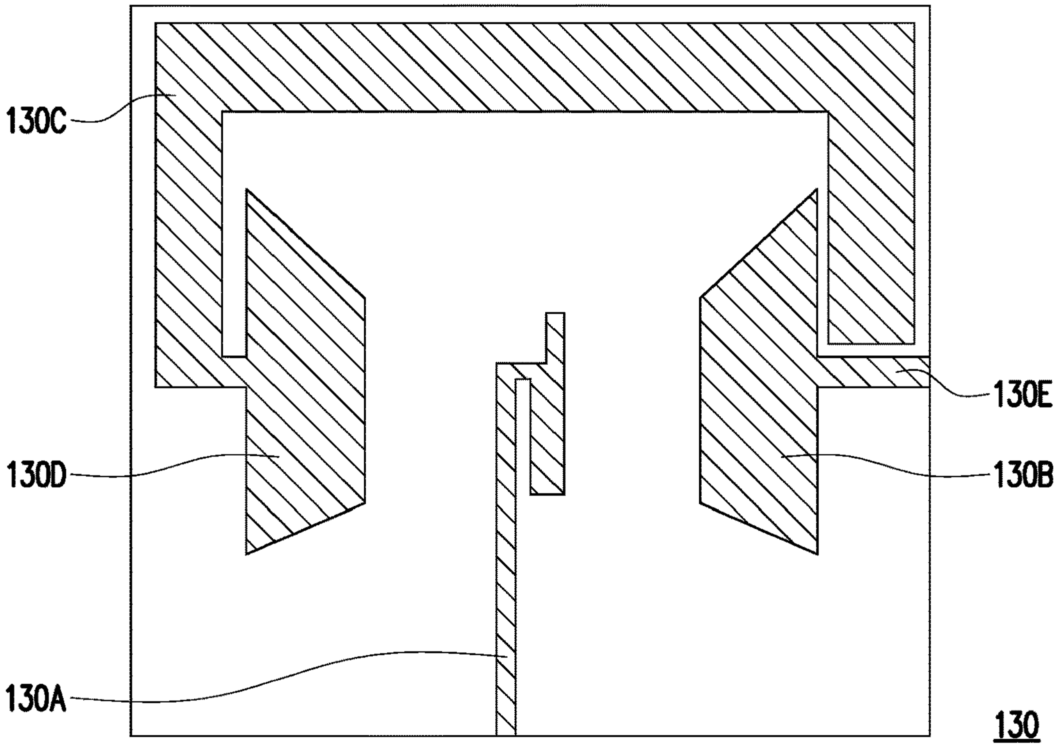
FIG. 3 is a schematic view of a second conductive pattern of the light-transmitting antenna of FIG. 1.

FIG. 3 is a schematic view of the second conductive pattern 130 of the light-transmitting antenna 100 of FIG. 1. Referring to FIGS. 2 and 3, in this embodiment, the third coupling unit 130B and the fourth coupling unit 130D are trapezoidal. In this embodiment, two base angles of the trapezoids of the radiation units are not equal, but the disclosure is not limited thereto. In this embodiment, the second conductive pattern 130 further has a fourth parasitic unit 130E. The fourth parasitic unit 130E is connected to the third coupling unit 130B. The other side of the second parasitic unit 130C is adjacent to the third coupling unit 130B and the fourth parasitic unit 130E. An orthographic projection of the fourth parasitic unit 130E on the first surface 112 overlaps the third parasitic unit 120G.

Figure 4:
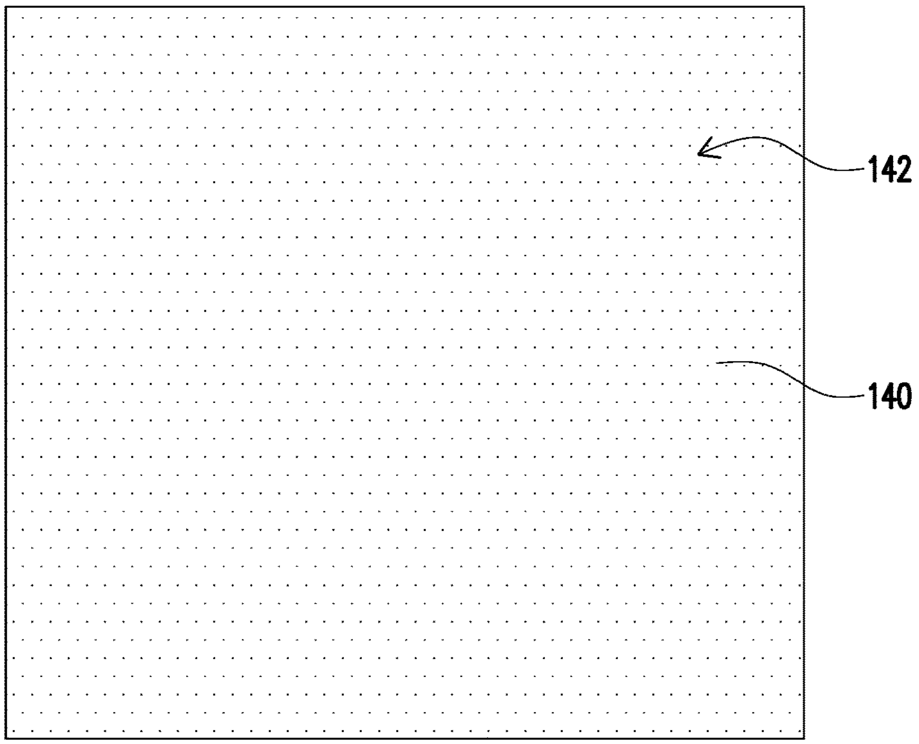
FIG. 4 is a schematic view of a conductive area of an electromagnetic wave reflector of the light-transmitting antenna of FIG. 1.

FIG. 4 is a schematic view of a conductive area 142 of the electromagnetic wave reflector 140 of the light-transmitting antenna of FIG. 1. Referring to FIGS. 1 and 4, in this embodiment, the electromagnetic wave reflector 140 has the conductive area 142. Orthographic projections of the second conductive pattern 130 and the first conductive pattern 120 on the electromagnetic wave reflector 140 all fall on the conductive area 142. Of course, portions at edges of the first feeder unit 120A and the second feeder unit 130A may not fall on the conductive area 142.

The following data are obtained after simulation with the light-transmitting antenna 100 of FIGS. 1 and 2. Dimensions of the three substrates are all 100 mm×100 mm. A thickness of the conductive pattern is 0.7 mm. The distance between the electromagnetic wave reflector 140 and the substrate 110 is 3 cm. A length of one side of the second feeder unit 130A close to the fourth coupling unit 130D is 51 mm, and a length of one side of the second feeder unit 130A close to the third coupling unit 130B is 25 mm. Front-back ratios of the light-transmitting antenna 100 at 1.8 GHz, 2.1 GHz, and 3.5 GHz are 21.9 dB, 52.07 dB, and 3330.4 dB, respectively. Peak gains of the light-transmitting antenna 100 at the XZ section and the YZ section at 1.8 GHz are 7.92 dB and 7.96 dB, respectively. The peak gains of the light-transmitting antenna 100 at the XZ section and the YZ section at 2.1 GHz are 7.15 dB and 7.2 dB, respectively. The peak gains of the light-transmitting antenna 100 at the XZ section and the YZ section at 3.5 GHz are 6.28 dB and 8.13 dB, respectively. An available frequency of the light-transmitting antenna 100 in the vicinity of 1.8 GHz is between 1.6 GHz and 2.2 GHz, and a converted antenna bandwidth is 32%, that is, it has a broadband characteristic. The available frequency of the light-transmitting antenna 100 in the vicinity of 3.5 GHz is between 1.2 GHz and 4.4 GHz, and the converted antenna bandwidth is 32%, that is, it has the broadband characteristic.

Figure 5:
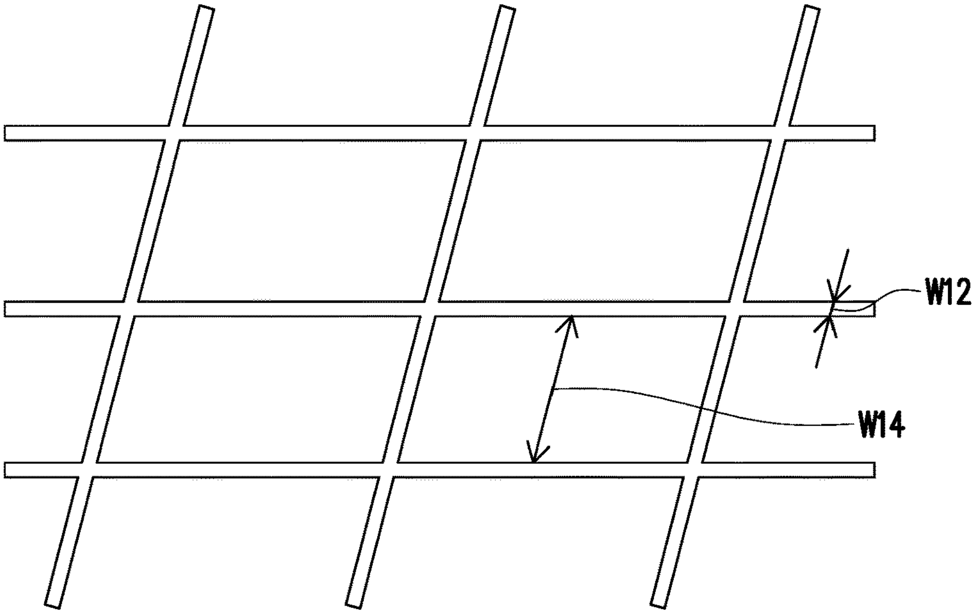
FIG. 5 is a schematic partial view of the first conductive pattern of the light-transmitting antenna of FIG. 1.

FIG. 5 is a schematic partial view of the first conductive pattern of the light-transmitting antenna of FIG. 1. Referring to FIGS. 1 and 5, in this embodiment, the first conductive pattern 120 and the second conductive pattern 130 are mesh metal. That is to say, within a range of the first conductive pattern 120 and the second conductive pattern 130 seen in FIG. 1, in an enlarged state, it may be seen that the first conductive pattern 120 and the second conductive pattern 130 are formed by the mesh metal. Therefore, the light may pass through a mesh of the mesh metal, so that the first conductive pattern 120 and the second conductive pattern 130 may transmit the light. In this embodiment, the mesh metal has a line width W12 and a mesh width W14. Considering the light transmittance, the line width W12 is, for example, between 0.05 times and 0.1 times the mesh width W14. In addition, if a manufacturing process is feasible, meshes of the first conductive pattern 120 and the second conductive pattern 130 may be completely overlapped as much as possible to improve the light transmittance.

Figure 6:
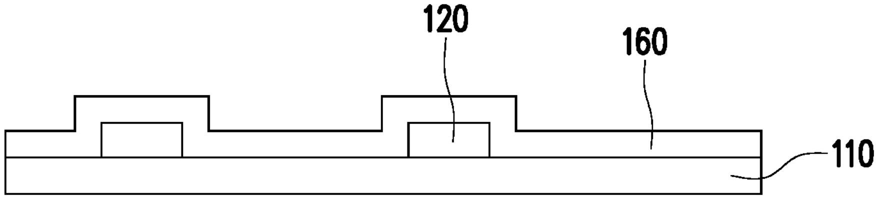
FIG. 6 is a schematic partial cross-sectional view of the first conductive pattern of the light-transmitting antenna of FIG. 1.

FIG. 6 is a schematic partial cross-sectional view of the first conductive pattern 120 of the light-transmitting antenna of FIG. 1. Referring to FIG. 6, in this embodiment, the light-transmitting antenna 100 further includes a protective layer 160 covering the first conductive pattern 120 and the second conductive pattern 130. The protective layer 160 may protect the first conductive pattern 120 and the second conductive pattern 130. In addition, by properly selecting a material of the protective layer 160, a function of index matching may be exerted to improve the light transmittance of the light-transmitting antenna 100. Furthermore, the protective layer 160 may also have conductivity to reduce impedance of the overall first conductive pattern 120 and second conductive pattern 130, thereby improving efficiency of signal transmission. When the protective layer 160 has the conductivity, the protective layer 160 does not cover the entire first surface 112 and second surface 114. An area covered by the protective layer 160 is substantially equal to an area where the first conductive pattern 120 is distributed and an area where the second conductive pattern 130 is distributed, so as to avoid changing an appearance of the radiation unit and affecting transmission and reception of the signal.

Figure 7:
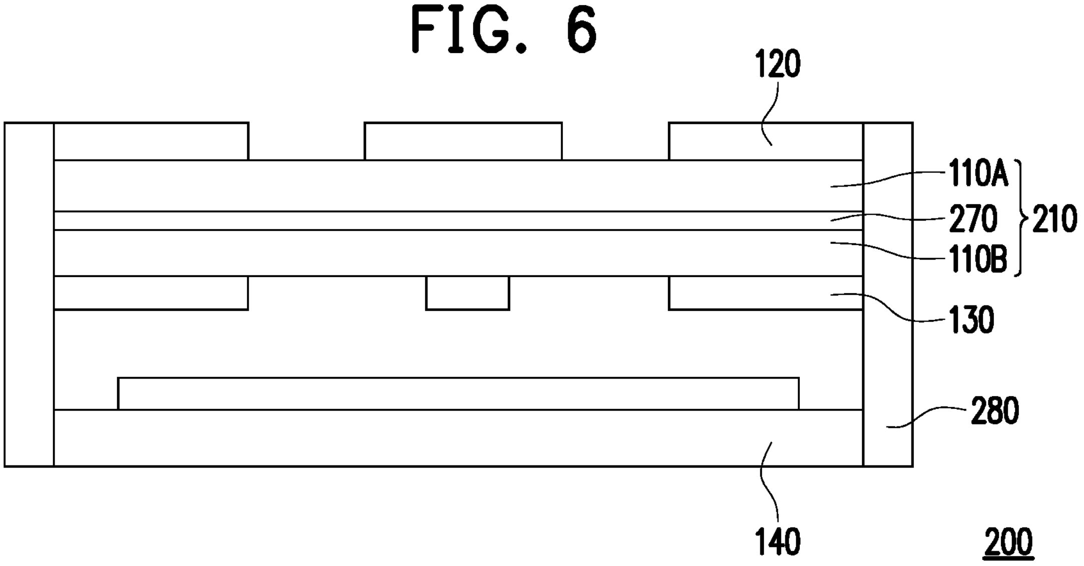
FIG. 7 is a schematic perspective view of a light-transmitting antenna according to another embodiment of the disclosure.

FIG. 7 is a schematic perspective view of a light-transmitting antenna according to another embodiment of the disclosure. In FIG. 7, a dimension and scale of each element have been adjusted for convenience only, and are not actual dimensions and scales. Referring to FIG. 7, a light-transmitting antenna 200 of this embodiment is substantially the same as the light-transmitting antenna 100 of FIG. 1, and only the difference between the two is described here. A substrate 210 of this embodiment further includes an optical adhesive layer 270 disposed between the first substrate 110A and the second substrate 110B. The optical adhesive layer 270 may improve the accuracy of alignment of the first conductive pattern 120 and the second conductive pattern 130. In addition, it may also improve the light transmittance of the substrate 210 to select a material with an appropriate refractive index as the optical adhesive layer 270. The light-transmitting antenna 200 of this embodiment may further include an outer frame 280 configured to fix the electromagnetic wave reflector 140, the first substrate 110A, and the second substrate 110B.

Figure 8:
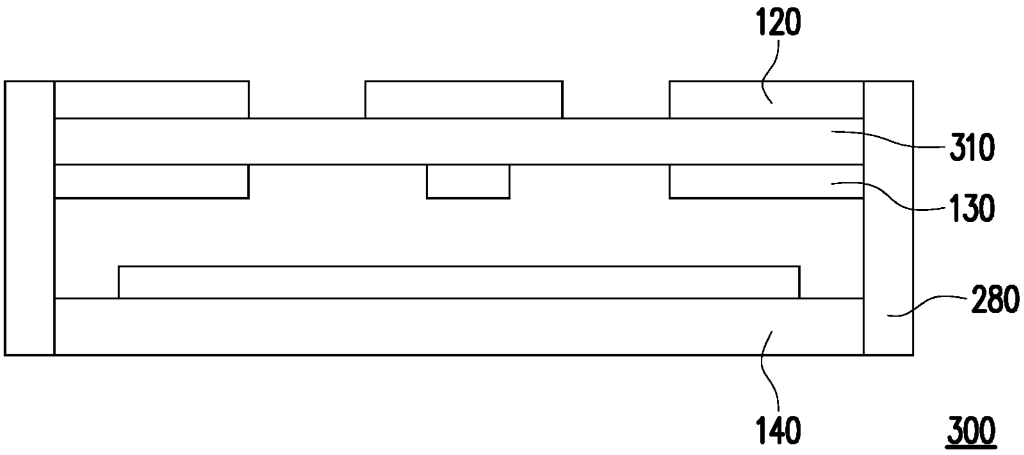
FIG. 8 is a schematic perspective view of a light-transmitting antenna according to still another embodiment of the disclosure.

FIG. 8 is a schematic perspective view of a light-transmitting antenna according to still another embodiment of the disclosure. In FIG. 8, a dimension and scale of each element have been adjusted for convenience only, and are not actual dimensions and scales. Referring to FIG. 8, a light-transmitting antenna 300 of this embodiment is substantially the same as the light-transmitting antenna 100 of FIG. 1, and the difference is that a substrate 310 of this embodiment is a single substrate, not formed by two or more substrates. Therefore, the light transmittance of the light-transmitting antenna 300 is better.

Based on the above, the light-transmitting antenna of the disclosure may be installed indoors to reduce the cable signal loss, and further has the characteristics such as the full-plane currents, multiple frequencies, narrow beams, and high gain.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An antenna, comprising:

a substrate having a first surface and a second surface opposite to each other;

a first conductive pattern disposed on the first surface and comprising a first feeder unit, a first radiation unit, a first coupling unit, a first parasitic unit, a second radiation unit, and a second coupling unit, wherein the first feeder unit is connected to the second radiation unit, the first radiation unit and the second radiation unit are located between the first coupling unit and the second coupling unit, one side of the first parasitic unit is connected to the second coupling unit, and the other side the first parasitic unit is adjacent to the first coupling unit; and a second conductive pattern disposed on the second surface and comprising a second feeder unit, a third coupling unit, a second parasitic unit, and a fourth coupling unit, wherein an orthographic projection of the second feeder unit on the first surface overlaps the first feeder unit, the first radiation unit, and the second radiation unit, an orthographic projection of the third coupling unit on the first surface overlaps the first coupling unit, an orthographic projection of the fourth coupling unit on the first surface overlaps the second coupling unit, an orthographic projection of the second parasitic unit on the first surface overlaps the first parasitic unit, one side of the second parasitic unit is connected to the fourth coupling unit, and the other side of the second parasitic unit is adjacent to the third coupling unit; and wherein the antenna allows the passage of light therethrough.

2. The antenna according to claim 1, further comprising an electromagnetic wave reflector stacked with the substrate at a distance.

3. The antenna according to claim 2, wherein the second conductive pattern is located between the first conductive pattern and the electromagnetic wave reflector.

4. The antenna according to claim 2, wherein the electromagnetic wave reflector has a conductive area, and orthographic projections of the second conductive pattern and the first conductive pattern on the electromagnetic wave reflector all fall on the conductive area.

5. The antenna according to claim 2, wherein the light-transmitting antenna has an operating wavelength, and a distance between the electromagnetic wave reflector and the substrate is between 0.25 times and 2 times the operating wavelength.

6. The antenna according to claim 1, wherein the substrate has no conductive through holes.

7. The antenna according to claim 1, further comprising a feeder, wherein the first feeder unit and the second feeder unit are respectively electrically connected to the feeder at an edge of the substrate.

8. The antenna according to claim 1, wherein the first radiation unit and the second radiation unit are trapezoidal.

9. The antenna according to claim 1, wherein the first coupling unit, the second coupling unit, the third coupling unit, and the fourth coupling unit are trapezoidal.

10. The antenna according to claim 1, wherein the first conductive pattern further has a third parasitic unit, the second conductive pattern further has a fourth parasitic unit, the third parasitic unit is connected to the first coupling unit, the fourth parasitic unit is connected to the third coupling unit, the other side of the first parasitic unit is adjacent to the first coupling unit and the third parasitic unit, the other side of the second parasitic unit is adjacent to the third coupling unit and the fourth parasitic unit, and an orthographic projection of the fourth parasitic unit on the first surface overlaps the third parasitic unit.

11. The antenna according to claim 1, wherein the substrate comprises a first substrate and a second substrate stacked with each other, a surface of the first substrate facing away from the second substrate is the first surface, and a surface of the second substrate facing away from the first substrate is the second surface.

12. The antenna according to claim 11, wherein the substrate further comprises an optical adhesive layer disposed between the first substrate and the second substrate.

13. The antenna according to claim 1, wherein a shape of the first radiation unit and a shape of the second radiation unit are line-symmetrical patterns with a boundary line therebetween as a symmetrical line.

14. The antenna according to claim 1, further comprising a protective layer covering the first conductive pattern and the second conductive pattern.

15. The antenna according to claim 1, wherein the first conductive pattern and the second conductive pattern are mesh metal.

16. The antenna according to claim 15, wherein the mesh metal has a line width and a mesh width, and the line width is between 0.05 times and 0.1 times the mesh width.

* * * * *